US011913483B2

(12) United States Patent
Nettleton (10) Patent No.: US 11,913,483 B2
(45) Date of Patent: Feb. 27, 2024

(54) INSULATED STAPLE AND STAPLE COLLATION

(71) Applicant: MILWAUKEE ELECTRIC TOOL CORPORATION, Brookfield, WI (US)

(72) Inventor: Coby A. Nettleton, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 155 days.

(21) Appl. No.: 17/332,150

(22) Filed: May 27, 2021

(65) Prior Publication Data

US 2021/0372451 A1 Dec. 2, 2021

Related U.S. Application Data

(60) Provisional application No. 63/071,607, filed on Aug. 28, 2020, provisional application No. 63/030,987, filed on May 28, 2020.

(51) Int. Cl.
*F16B 15/08* (2006.01)
*F16B 15/00* (2006.01)

(52) U.S. Cl.
CPC .......... *F16B 15/0015* (2013.01); *F16B 15/08* (2013.01)

(58) Field of Classification Search
CPC ...... F16B 15/0015; F16B 15/08; F16B 15/00; F16B 15/0092; H01B 17/66
USPC .......................... 411/190, 457, 475, 468, 920
See application file for complete search history.

(56) References Cited

U.S. PATENT DOCUMENTS

| 662,587 | A | * | 11/1900 | Blake | F16L 3/04 248/71 |
| 2,001,288 | A | | 5/1935 | Schorr | |
| 2,003,062 | A | * | 5/1935 | Wickwire | F16B 15/02 411/469 |
| 2,140,593 | A | * | 12/1938 | Pankonin | F16B 15/0015 411/443 |
| 2,351,608 | A | | 6/1944 | Greenwood | |

(Continued)

FOREIGN PATENT DOCUMENTS

| CN | 306890083 | 10/2021 |
| ES | 1009747 U | 10/1989 |

(Continued)

OTHER PUBLICATIONS

International Search Report and Written Opinion for Application No. PCT/US2021/034459 dated Sep. 8, 2021 (12 pages).

*Primary Examiner* — Victor D Batson
*Assistant Examiner* — Dil K. Magar
(74) *Attorney, Agent, or Firm* — Michael Best & Friedrich LLP (57) ABSTRACT

An insulated staple includes a staple including a crown extending between a pair of legs and an insulator including an insulator bridge extending between a pair of insulator legs and a channel extending from an end of one of the insulator legs to an end of the other of the insulator legs. The staple is at least partially received in the channel. A width of the channel at the insulator bridge is greater than a thickness of the staple crown. The insulator includes protrusions extending into the channel and defining therebetween a gap that, in absence of the staple, has a width less than the width of the staple crown to provide a friction fit between the staple crown and the insulator.

20 Claims, 12 Drawing Sheets

(56) References Cited

U.S. PATENT DOCUMENTS

| | | | |
|---|---|---|---|
| 2,521,019 A | 9/1950 | Percoco | |
| 2,526,902 A * | 10/1950 | Rublee | F16B 15/0015 411/444 |
| 2,632,356 A | 3/1953 | Thiel | |
| 3,076,373 A | 2/1963 | Matthews | |
| 3,085,129 A | 4/1963 | Anderson | |
| 3,170,160 A | 2/1965 | Burniston | |
| 3,241,797 A | 3/1966 | Anderson | |
| 3,788,187 A * | 1/1974 | Knohl | C07D 499/00 411/456 |
| 3,894,174 A * | 7/1975 | Cartun | B21F 45/24 411/487 |
| 3,940,844 A * | 3/1976 | Colby | F16L 3/04 59/77 |
| 4,129,059 A | 12/1978 | Van Eck | |
| 4,278,091 A | 7/1981 | Borzone | |
| D261,356 S | 10/1981 | Robinson | |
| 4,532,927 A | 8/1985 | Miksza, Jr. | |
| 4,534,350 A | 8/1985 | Golden et al. | |
| D280,931 S | 10/1985 | Green | |
| D280,932 S | 10/1985 | Green | |
| 4,570,623 A | 2/1986 | Ellison et al. | |
| 4,573,469 A | 3/1986 | Golden et al. | |
| 4,697,045 A | 9/1987 | Beatty | |
| D298,916 S | 12/1988 | Beatty | |
| D330,699 S | 11/1992 | Gill | |
| 5,209,756 A * | 5/1993 | Seedhom | A61B 17/88 606/220 |
| 5,223,675 A * | 6/1993 | Taft | H02G 3/26 174/164 |
| 5,620,289 A | 4/1997 | Curry | |
| 5,718,548 A | 2/1998 | Cotellessa | |
| 5,735,444 A | 4/1998 | Wingert | |
| D402,540 S | 12/1998 | Stridh | |
| 6,305,891 B1 | 10/2001 | Burlingame | |
| 6,530,803 B1 * | 3/2003 | Chen | H01R 13/5837 439/465 |
| 7,722,610 B2 | 5/2010 | Viola et al. | |
| 7,874,778 B1 | 1/2011 | Derrig et al. | |
| 8,282,328 B2 | 10/2012 | Gardner et al. | |
| 8,303,226 B1 | 11/2012 | Derrig et al. | |
| 8,348,972 B2 | 1/2013 | Soltz et al. | |
| D705,930 S | 5/2014 | Cheney | |
| D707,357 S | 6/2014 | Cheney et al. | |
| 8,858,146 B1 | 10/2014 | Derrig et al. | |
| 9,011,063 B1 | 4/2015 | Derrig et al. | |
| 9,422,962 B1 * | 8/2016 | Stratton | F16B 15/08 |
| 10,085,743 B2 | 10/2018 | Roedl et al. | |
| D836,072 S | 12/2018 | Gray | |
| 10,563,685 B2 | 2/2020 | Tao | |
| 10,662,991 B2 | 5/2020 | Gray | |
| 10,704,583 B2 | 7/2020 | Fairbanks et al. | |
| D980,051 S | 3/2023 | Nettleton | |
| 2003/0099102 A1 | 5/2003 | Duval | |
| 2004/0126201 A1 | 7/2004 | Kobylinski et al. | |
| 2004/0247415 A1 | 12/2004 | Peter, Jr. | |
| 2004/0262461 A1 * | 12/2004 | Del Re | H02G 3/32 248/71 |
| 2006/0233628 A1 | 10/2006 | Lee | |
| 2009/0261141 A1 | 10/2009 | Stratton et al. | |
| 2011/0262247 A1 | 10/2011 | Kanai | |
| 2015/0063949 A1 | 3/2015 | Young | |
| 2018/0172052 A1 * | 6/2018 | Gray | F16L 3/04 |
| 2019/0101147 A1 * | 4/2019 | Fairbanks | F16B 15/08 |
| 2019/0154070 A1 | 5/2019 | Kargenian et al. | |
| 2019/0154071 A1 | 5/2019 | Tao | |
| 2019/0315282 A1 * | 10/2019 | Murray | B60R 7/10 |
| 2019/0337135 A1 | 11/2019 | Kargenian et al. | |
| 2020/0083691 A1 | 3/2020 | Kawashima | |
| 2021/0131470 A1 | 5/2021 | Wei | |
| 2021/0372451 A1 | 12/2021 | Nettleton | |

FOREIGN PATENT DOCUMENTS

| | | |
|---|---|---|
| GB | 257753 | 9/1926 |
| GB | 843061 A | 8/1960 |
| JP | S5676280 A | 6/1981 |
| JP | S56118770 A | 9/1981 |
| JP | H0293109 A | 4/1990 |
| JP | H02203004 A | 8/1990 |
| JP | 2002130232 A | 5/2002 |
| WO | 2008094953 A2 | 8/2008 |

* cited by examiner

INSULATED STAPLE AND STAPLE COLLATION

CROSS-REFERENCE TO RELATED APPLICATION

The present application claims priority to U.S. Provisional Patent Application No. 63/071,607, filed on Aug. 28, 2020, and U.S. Provisional Patent Application No. 63/030,987, filed on May 28, 2020, the entire contents of both of which are incorporated herein by reference.

FIELD OF THE INVENTION

The present invention relates to fasteners, and more particularly to fasteners to be used with a powered fastener driver.

BACKGROUND OF THE INVENTION

Conventional staples typically are used to attach items (e.g., cables, wires, tubing and the like) to a workpiece (e.g., a post, a fence, a power pole, etc.). However, the staple being applied may at the time of application, due to impact of the fastener, penetrate, damage, or deform the item being fastened. This may result in an electrical short circuit. To prevent damage of the item, the staple may include insulation that prevents the staple from damaging the item.

SUMMARY OF THE INVENTION

The invention provides, in one aspect, an insulated staple including a staple having a crown extending between a pair of legs and an insulator having an insulator bridge extending between a pair of insulator legs and a channel extending from an end of one of the insulator legs to an end of the other of the insulator legs. The staple is at least partially received in the channel. A width of the channel at the insulator bridge is greater than a thickness of the staple crown. The insulator includes a plurality of protrusions extending into the channel and defining therebetween a gap that, in absence of the staple, has a width less than the width of the staple crown to provide a friction fit between the staple crown and the insulator.

The invention provides, in another aspect, a staple collation including a plurality of insulated staples. Each of the insulated staples includes a staple having a crown extending between a pair of legs and an insulator having an insulator bridge extending between a pair of insulator legs and a channel extending from an end of one of the insulator legs to an end of the other of the insulator legs. The staple is at least partially received in the channel. A width of the channel at the insulator bridge is greater than a thickness of the staple crown. And, the insulator includes a plurality of protrusions extending into the channel and defining therebetween a gap that, in absence of the staple, has a width less than the width of the staple crown to provide a friction fit between the staple crown and the insulator. The staple collation also includes a plurality of frangible connectors extending from the insulator and coupling adjacent insulated staples.

The invention provides, in another aspect, an insulated staple including a staple having a crown extending between a pair of legs and an insulator having an insulator bridge extending between a pair of insulator legs and a channel extending from an end of one of the insulator legs to an end of the other of the insulator legs. The staple is at least partially received in the channel. And, in absence of the staple, a width of the channel at the insulator legs is less than a thickness of the staple legs to provide a friction fit between the staple legs and the insulator.

The invention provides, in another aspect, a staple collation including a plurality of insulated staples. Each of the insulated staples includes a staple having a crown extending between a pair of legs and an insulator having an insulator bridge extending between a pair of insulator legs and a channel extending from an end of one of the insulator legs to an end of the other of the insulator legs. The staple is at least partially received in the channel. And, in absence of the staple, a width of the channel at the insulator legs is less than a thickness of the staple legs to provide a friction fit between the staple legs and the insulator. The staple collation also includes a plurality of frangible connectors extending from the insulator and coupling adjacent insulated staples.

The invention provides, in another aspect, an insulated staple including a staple having a crown extending between a pair of legs and an insulator. The insulator includes an insulator bridge, a pair of insulator legs extending from opposite ends of the insulator bridge, opposite first and second insulator walls spanning the insulator bridge and the insulator legs, and first and second side walls connecting the first insulator wall and the opposite second insulator wall at the respective insulator legs. A channel extends from one of the insulator legs to the other of the insulator legs. The staple is at least partially received in the channel. And, the side walls of the respective insulator legs cover a portion of each of the staple legs while the crown of the staple is uncovered.

The invention provides, in another aspect, a staple collation including a plurality of insulated staples, each including a staple including a crown extending between a pair of legs, and an insulator including an insulator bridge, a pair of insulator legs extending from opposite ends of the insulator bridge, opposite first and second insulator walls spanning the insulator bridge and the insulator legs, and first and second side walls connecting the first insulator wall and the opposite second insulator wall at the respective insulator legs. A channel extends from one of the insulator legs to the other of the insulator legs. The staple is at least partially received in the channel. The side walls of the respective insulator legs cover a portion of each of the staple legs while the crown of the staple is uncovered. The staple collation also includes a plurality of frangible connectors extending from the insulator and coupling adjacent insulated staples.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
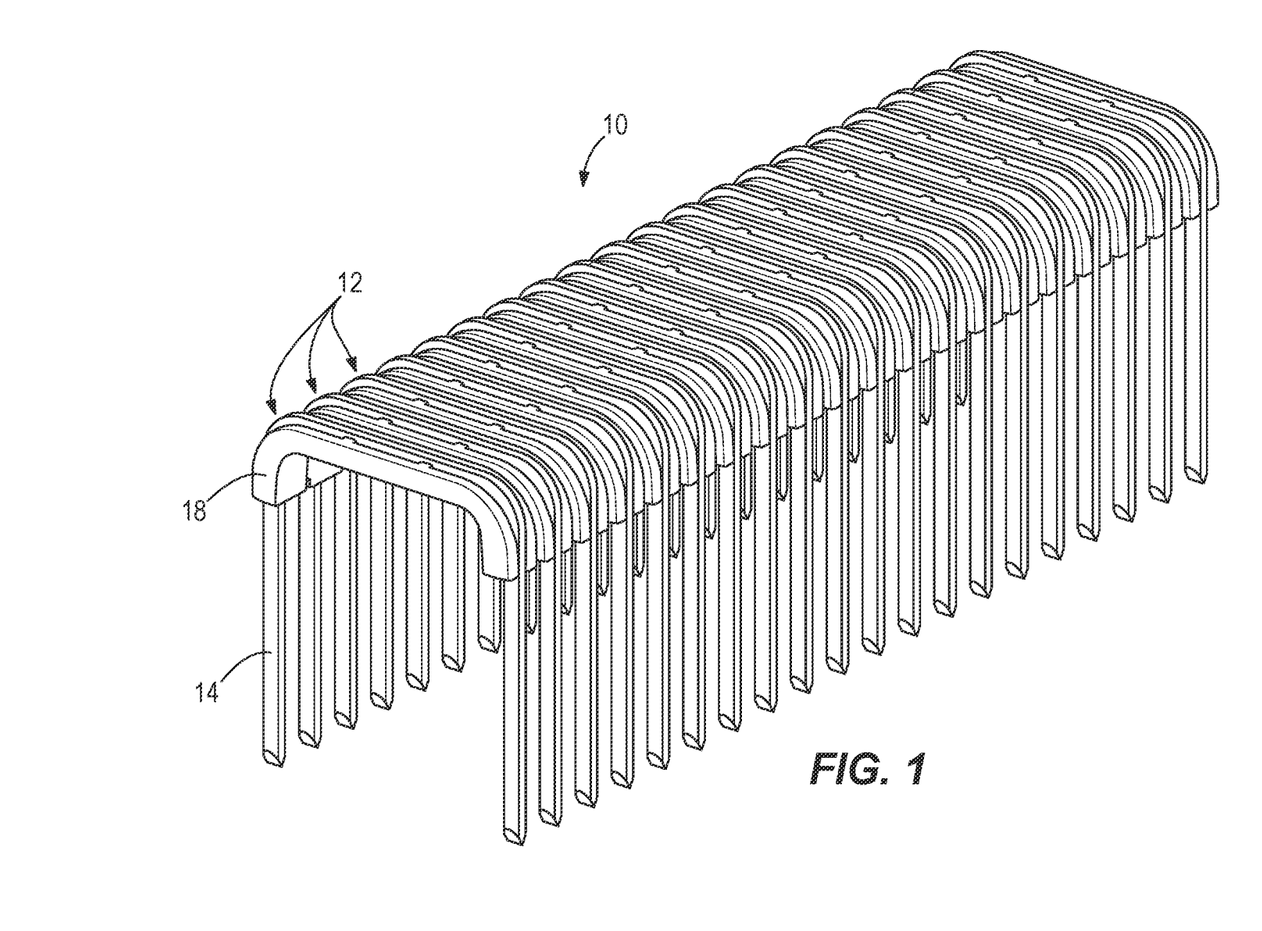
FIG. 1 is a perspective view of a staple collation according to an embodiment of the invention.
Figure 2:
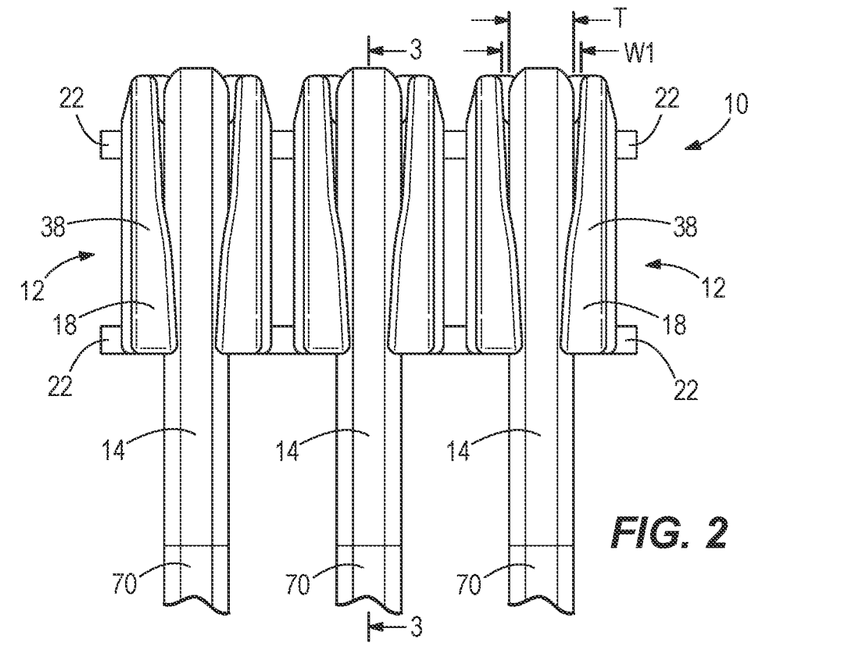
FIG. 2 is a side view of the staple collation of FIG. 1.

FIGS. 1 and 2 illustrate a staple collation 10 that can be used with an electrically powered fastening or stapling device to secure an article to a workpiece. The staple collation 10 includes a plurality of insulated staples 12, each of which includes a staple 14 and an insulator 18 in which the staple 14 is received. Adjacent insulators 18 are coupled via frangible connectors 22.

Figure 3:
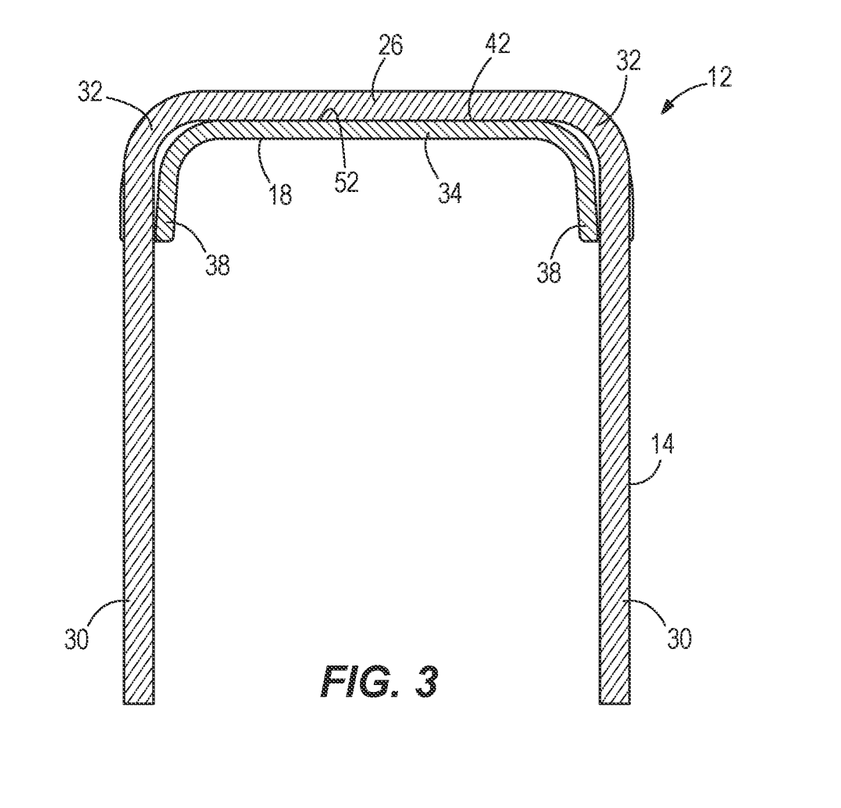
FIG. 3 is a cross-sectional view of the staple collation of FIG. 2 along line 3-3.

With reference to FIG. 3, the staple 14 includes a crown 26 extending between a pair of legs 30. The legs 30 extend in a direction perpendicular to the crown 26 and are parallel to each other. The legs 30 and the crown 26 are coupled at opposite corners 32, which are defined by a single radius. The legs 30 and the crown 26 define a constant thickness. In alternative embodiments, the legs 30 and the crown 26 may define different or varying thicknesses.

As shown in FIGS. 4-7, the insulator 18 includes an insulator bridge 34 extending between a pair of insulator legs 38. A channel 42 extends from an end of one insulator leg 38, through the crown 26, and to an end of the other insulator leg 38. The channel 42 is configured to receive the staple 14 therein. The channel 42 is defined by a first insulator wall 46, an opposite second insulator wall 50, and an interior wall 52. Along the bridge 34, a width W1 of the channel 42 is greater than the thickness T of the staple 14 (FIG. 2). At the insulator legs 38, the first and second insulator walls 46, 50 increase in thickness, thereby narrowing the width of the channel 42 through the legs 38. In the illustrated embodiment of the insulator 18, the width of the channel 42 through the insulator legs 38 decreases from the first width W1 to a second width W2 (FIG. 5), which is nominally less than the thickness T of the staple 14 to provide a slight friction-fit between the insulator 18 and the staple legs 30. In addition, the first and second insulator walls 46, 50 remain unconnected through the insulator legs 38, so the insulator legs 38 only partially surround the legs 14 of the staples 12.

Figure 4:
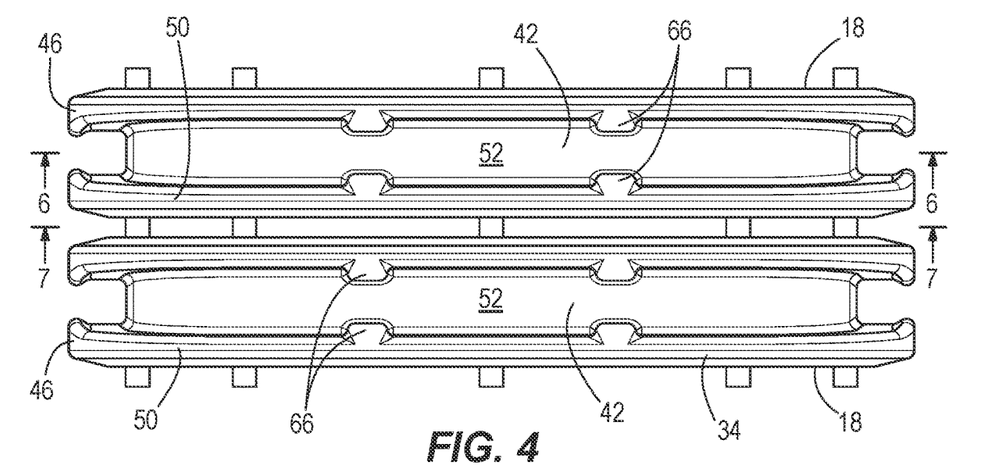
FIG. 4 is a top view of connected insulators of the staple collation of FIG. 1.
Figure 5:
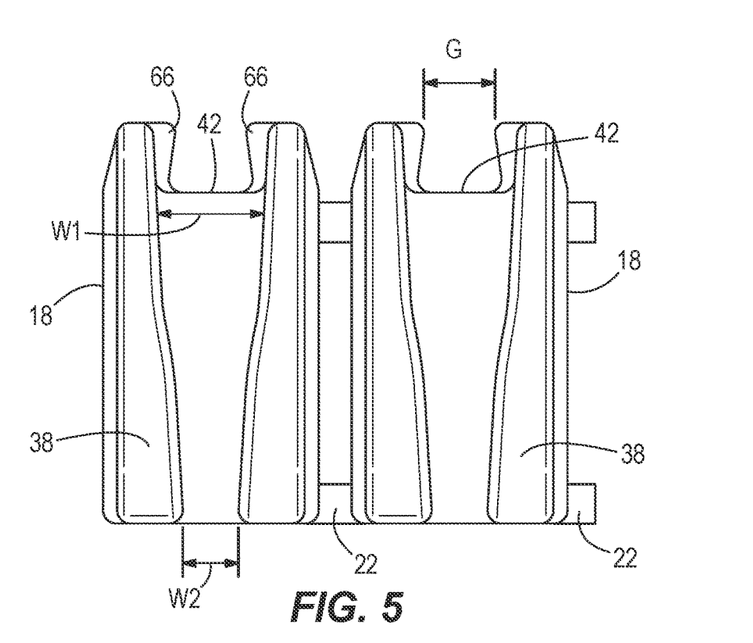
FIG. 5 is a side view of the connected insulators of FIG. 4.
Figure 6:
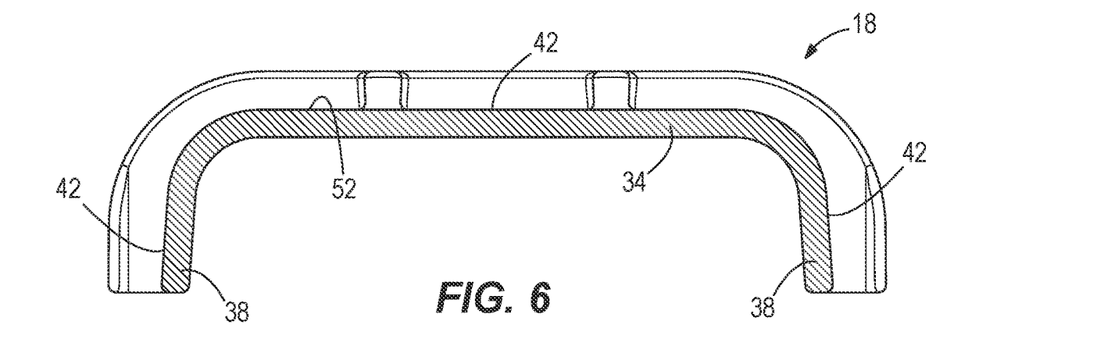
FIG. 6 is a cross-sectional view of the insulator of FIG. 4 along line 6-6.
Figure 7:
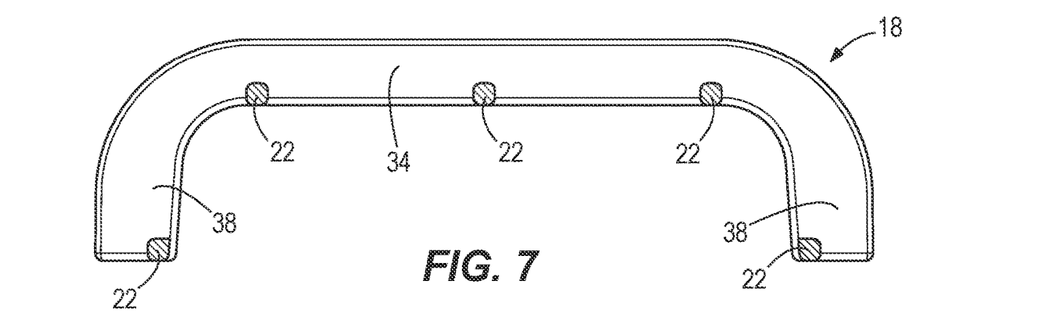
FIG. 7 is a cross-sectional view of the insulator of FIG. 4 along line 7-7.
Figure 8:
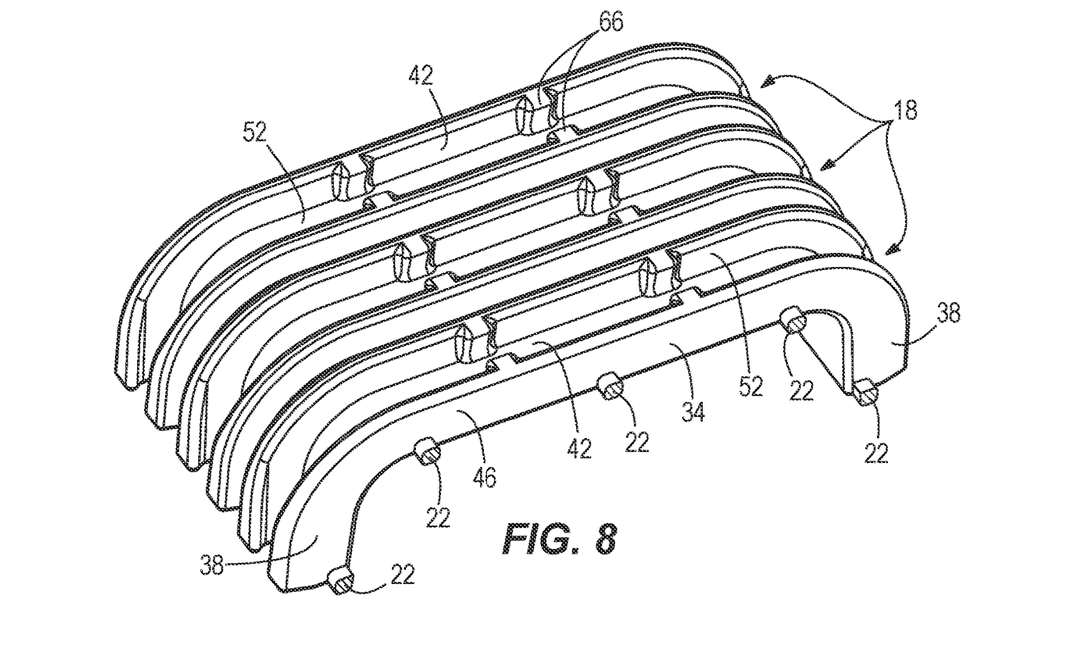
FIG. 8 is a top perspective view of the connected insulators of FIG. 4.

With reference to FIGS. 4, 5, and 8, along the insulator bridge 34, the first and second insulator walls 46, 50 include protrusions 66 that extend inwardly into the channel 42. Although the width W1 of the channel 42 at the insulator bridge 34 is less than the thickness T of the staple 14, a gap G between facing protrusions 66 on the walls 46, 50 is nominally less than the thickness T of the staple 14 to provide a slight friction-fit between the insulator 18 and the staple crown 26. When the staple 14 is received into the channel 42 of the insulator 18, a bottom face of the staple 14 engages with the interior wall 52 of the channel 42. The protrusions 66 at the insulator bridge 34 engage with opposite sides of the crown 26, clamping the crown 26 therebetween and inhibiting removal of the staple 14 from the insulator 18.

In the illustrated embodiment, the protrusions 66 include a first protrusion extending from the first insulator wall 46 and a second protrusion extending from the second insulator wall 50 towards the first protrusion to define the gap G. The protrusions 66 further include third and fourth protrusions that respectively extend from the first and second walls 46, 50, which are laterally spaced from the first and second protrusions. In other embodiments, the insulator may include more (e.g., 5, 6, etc.) or fewer protrusions (e.g., 2). The protrusions 66 may further include a tapered profile that conforms with the crown of the staple. For example, the thickness of the protrusions 66 adjacent the interior wall 52 may be less than the thickness of the protrusions 66 adjacent an opening of the channel 42.

Frangible connectors 22 (FIGS. 2, 4, 5, 7, and 8) extend from opposite sides of each insulator 18. A plurality of the frangible connectors 22 connect adjacent insulators 18. In the depicted embodiment, five frangible connectors 22 connect adjacent insulators 18—two frangible connectors 22 connect the insulator legs 38 and three frangible connectors 22 connect the insulator bridges 34. In alternative embodiments, greater than or less than five frangible connectors 22 may connect adjacent insulators 18. The frangible connectors 22 are configured to break in response to application of a shear force between two insulators 18. For example, the frangible connectors 22 connecting a first insulated staple 12 within the drive channel of a powered stapler with a second insulated staple 12 within the magazine of the powered stapler are broken in response to the drive blade of the powered stapler striking the crown 26 of the first insulated staple 12. When the frangible connectors 22 break, the first insulated staple 12 may be driven into a workpiece while the remainder of the staple collation 10 stays within the magazine of the powered stapler.

The staple 14 may be formed from any material including, but not limited to, a metal. In some embodiments, the staple 14 is formed from 1040 steel. The staple 14 may also have a coating including, but not limited to, a zinc or an aluminum-zinc coating to inhibit corrosion of the staple 14. An adhesive 70 (FIG. 2) may be applied to the legs 30 of the staples 14 to help maintain the staple 14 within the workpiece after being driven from the powered stapler. The insulator 18 may be formed from any electrically non-conductive and flexible material including, but not limited to, a plastic material. The frangible connectors 22 may be integrally formed with and from the same material as the insulator 18. Because the insulator 18 is formed from a flexible material, when the insulated staple 12 is driven into a workpiece to secure an article to the workpiece, the insulator 18 prevents the staple 14 from damaging the article. This is useful when the article is an electrical wire, the jacket for which in absence of the insulator 18 may be damaged by the staple 14. And, because the insulator 18 is non-conductive, the metal staple 14 is insulated from the electrical wire.

FIGS. 9-17 illustrate a staple collation 110 according to another embodiment of the invention. The staple collation 110 is like the staple collation 10 shown in FIG. 1 and described above. Therefore, like features are identified with like reference numerals plus "100," and only the differences between the two will be discussed herein.

The insulator 118 differs from the insulator 18 in that the channel 142 is closed at the insulator legs 138. In other words, when the staple 114 is inserted into the insulator 118, the insulator legs 138 surround the legs 130 of the staple 114. And, rather than using the protrusions 66 in the bridge 34 to grasp the crown 126 of the staple 114, the width of the channel 142 in the insulator legs 138 tapers toward the bottom of the insulator 118 (FIG. 15) to provide a slight friction-fit between the insulator 118 and the staple legs 130.

Figure 9:
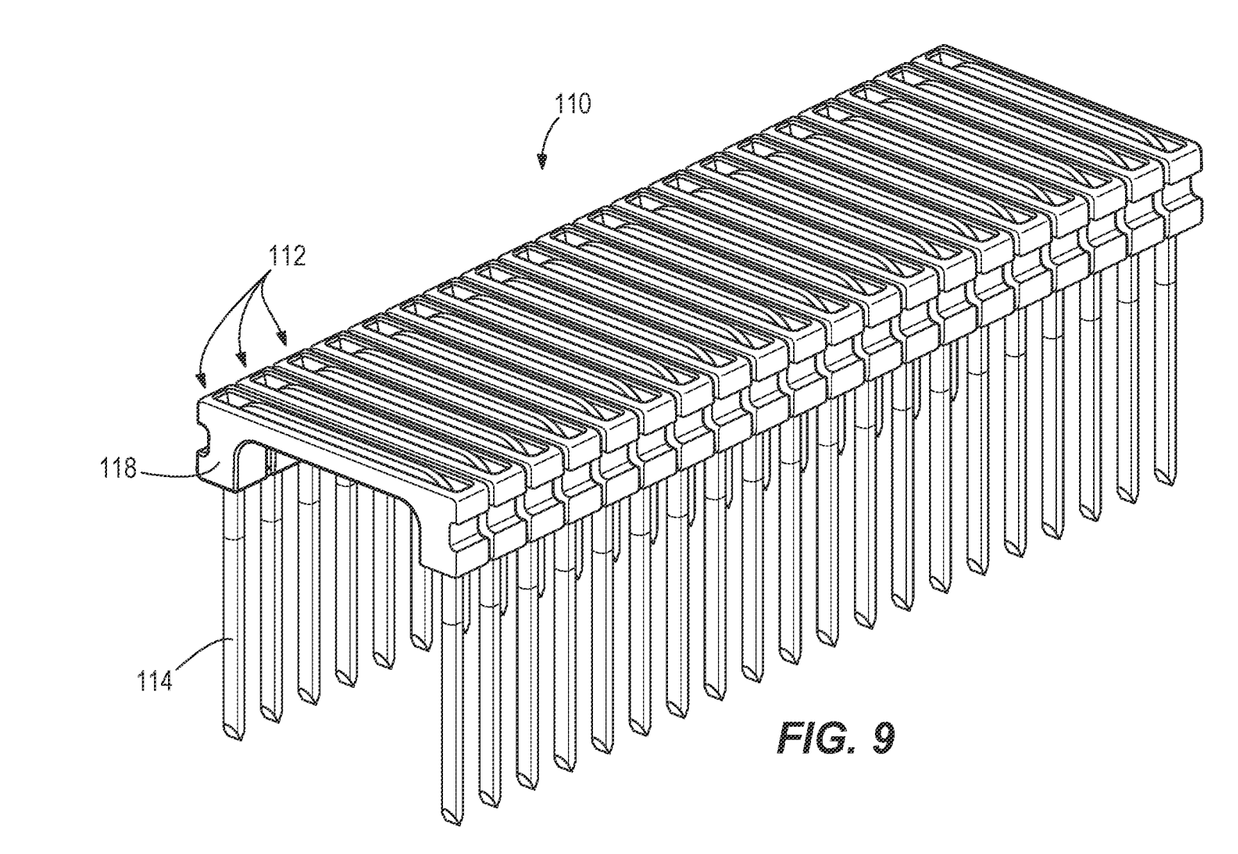
FIG. 9 is a perspective view of a staple collation according to another embodiment of the invention.
Figure 10:
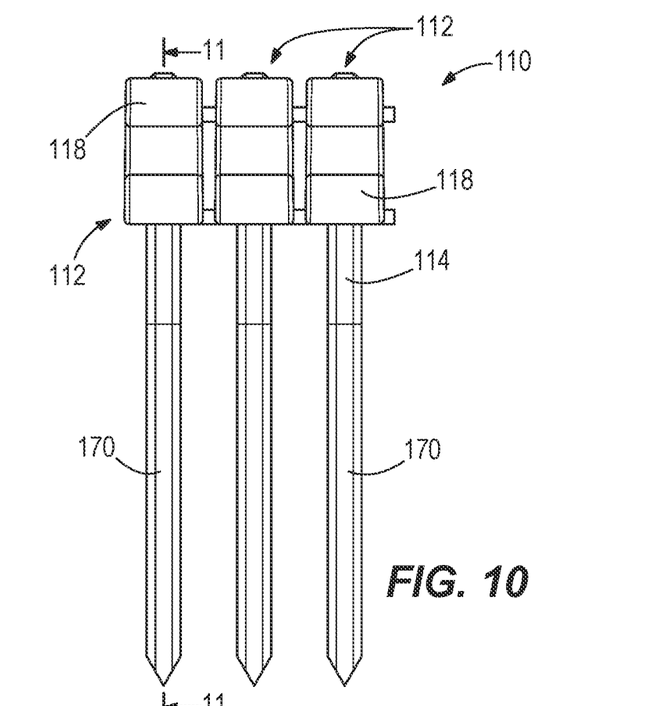
FIG. 10 is a side view of the staple collation of FIG. 9.
Figure 11:
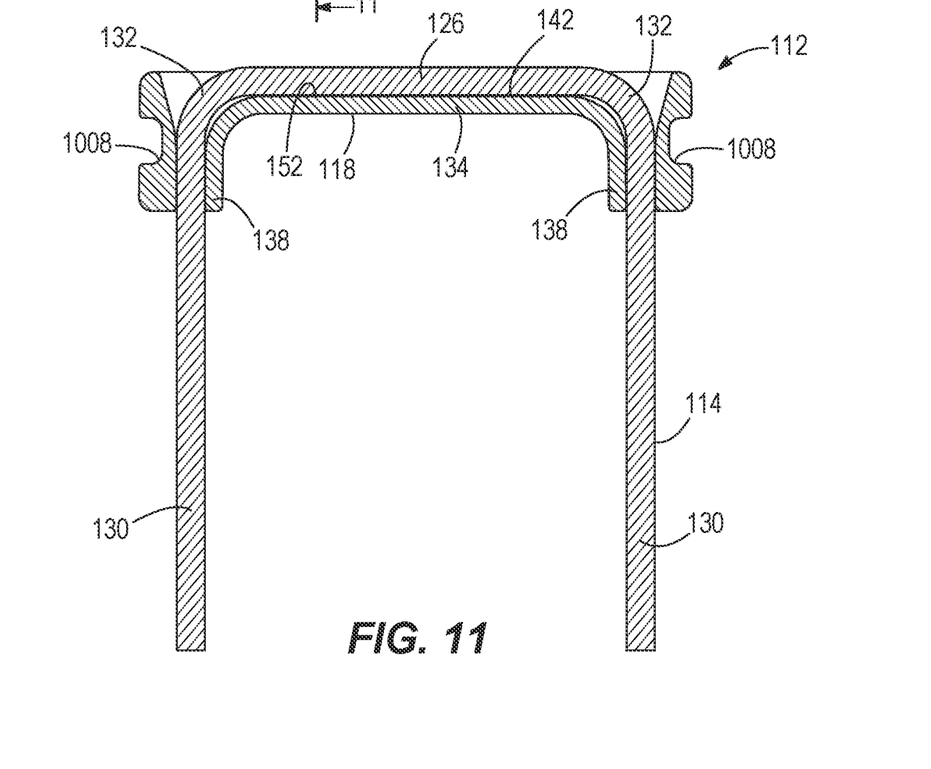
FIG. 11 is a cross-sectional view of the staple collation of FIG. 10 along line 11-11.
Figure 12:
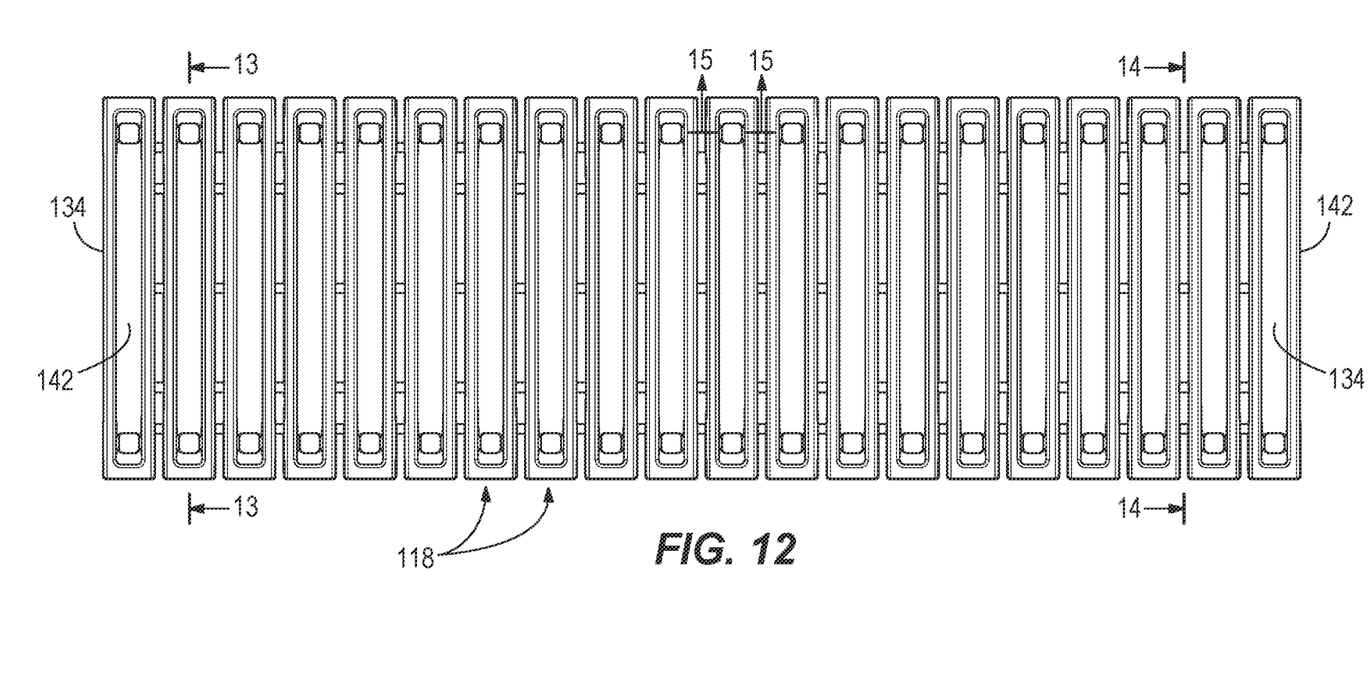
FIG. 12 is a top view of connected insulators of the staple collation of FIG. 9.
Figure 13:
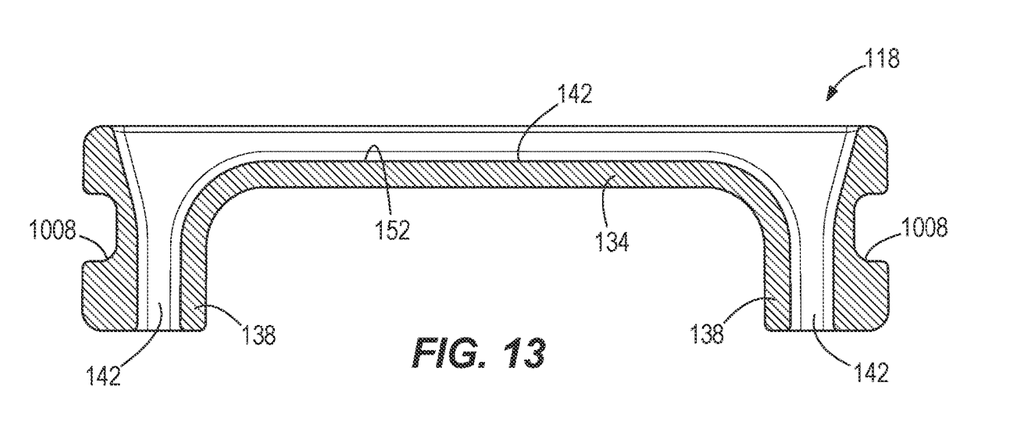
FIG. 13 is a cross-sectional view of the insulators of FIG. 12 along line 13-13.
Figure 14:
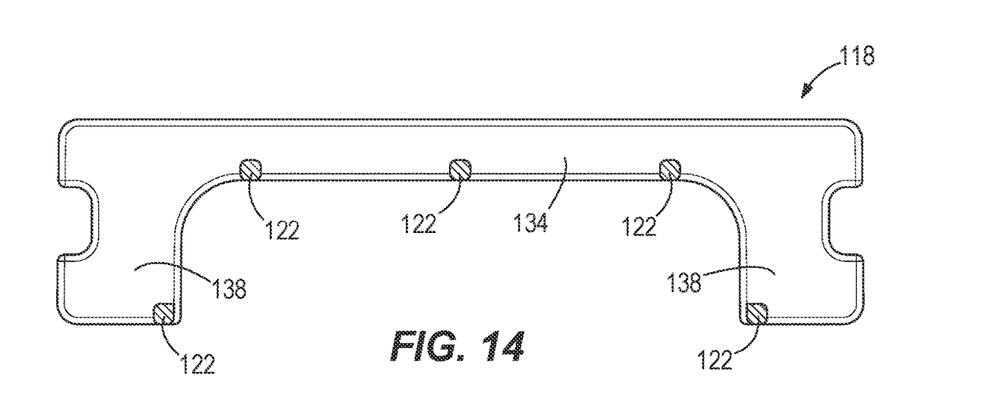
FIG. 14 is a cross-sectional view of the insulators of FIG. 12 along line 14-14.
Figure 15:
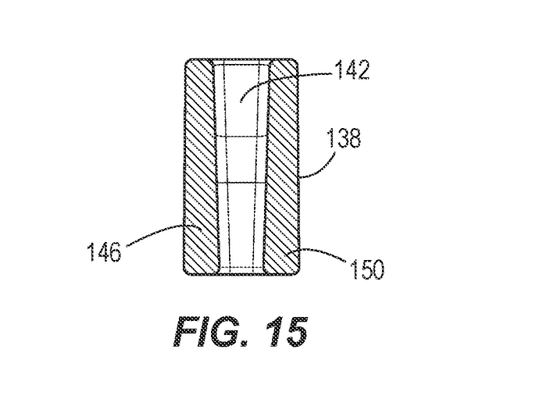
FIG. 15 is a cross-sectional view of the insulators of FIG. 12 along line 15-15.
Figure 16:
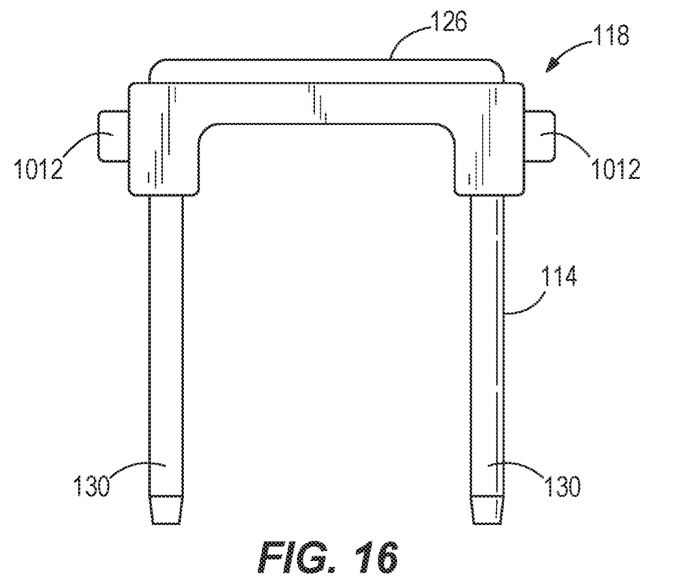
FIG. 16 is a front view of a staple collation according to another embodiment of the invention.
Figure 17:
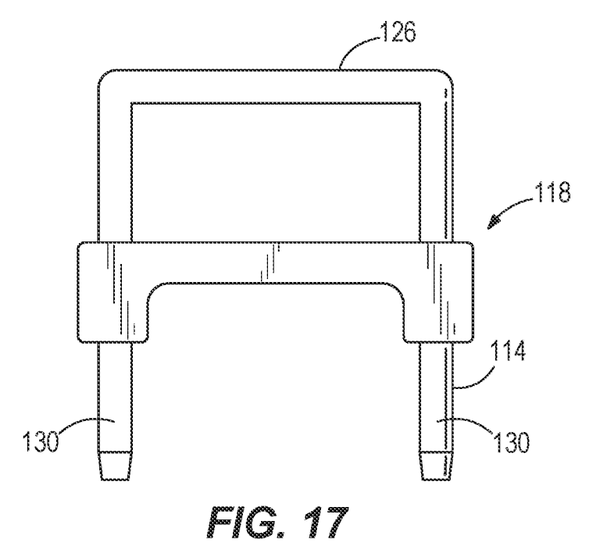
FIG. 17 is a front view of a staple collation according to another embodiment of the invention.
Figure 18:
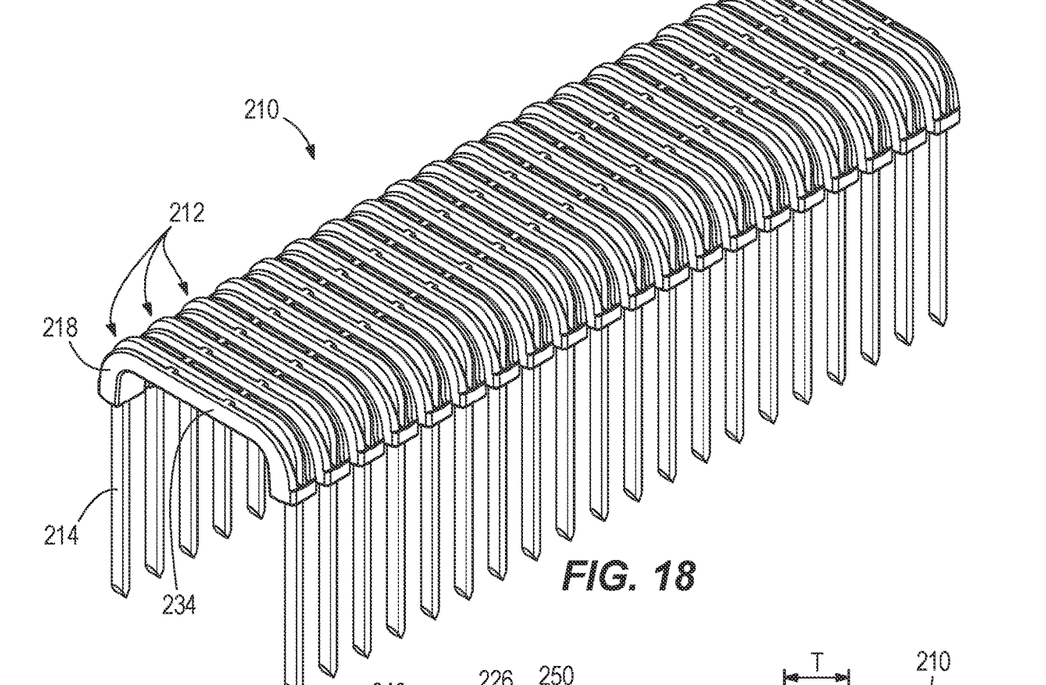
FIG. 18 is a perspective view of a staple collation according to another embodiment of the invention.

With reference to FIGS. 9, 11, and 13, the insulator 118 includes an alignment member formed on an outer surface of the insulator legs 138 to facilitate alignment of the staple 114 within the magazine. In some embodiments, the alignment member is a recess 1008 within each of the insulator legs 138 that faces laterally outward. The recesses 1008 provide for proper alignment of the insulator 118 and, therefore, the insulated staple 112 when the staple collation 110 is loaded in a magazine of a powered stapler. In alternative embodiments, the recesses 1008 may instead be configured as laterally outward-extending protrusions 1012 as shown in FIG. 16 to facilitate alignment of the staple collation 110 within the magazine of a powered stapler.

When the staple 114 is received into the channel 142 of the insulator 118, a bottom face of the staple 114 engages with the interior wall 152 of the channel 142 (FIG. 11). In alternative embodiments (FIG. 17), the crown 126 of the staple 114 may be separated from the interior wall 152 of the channel 142, leaving the only connection between the staple 114 and the insulator 118 between the legs 130, 138.

FIGS. 18-23 illustrate a staple collation 210 according to another embodiment of the invention. The staple collation 210 is like the staple collation 10 shown in FIG. 1 and described above. Therefore, like features are identified with like reference numerals plus "200," and only the differences between the two will be discussed herein.

The staple collation 210 includes a plurality of insulated staples 212, each of which includes a staple 214 and an insulator 218 in which the staple 214 is received. Adjacent insulators 218 are coupled via frangible connectors 222. With reference to FIG. 20, the staple 214 includes a crown 226 extending between a pair of legs 230. The legs 230 extend in a direction perpendicular to the crown 226 and are parallel to each other. The legs 230 and the crown 226 are coupled at opposite corners 232. An adhesive 270 (FIG. 19) may be applied to the legs 30 of the staples 14 to help maintain the staple 14 within the workpiece after being driven from the powered stapler.

The insulator 218 differs from the insulator 18, 118 in that the insulator legs 138 are tapered and surround the legs 230 of the staple 214. In other words, when the staple 214 is inserted into the insulator 218, the insulator legs 238 surround a portion of the legs 230 of the staple 214 without fully surrounding the crown 226 of the staple 214.

As shown in FIGS. 19-23, the insulator 218 includes an insulator bridge 234 extending between a pair of insulator legs 238. Each insulator leg 238 includes a side wall 2004 that transversely extends between a first insulator wall 246 and an opposite, second insulator wall 250. A channel 242 extends from the side wall 2004 of one insulator leg 238, through the crown 226, and to the side wall 2004 of the other insulator leg 238. The channel 242 is configured to receive the staple 14 therein. The channel 242 is defined by the first insulator wall 246, the opposite second insulator wall 250, the side walls 2004, and an interior wall 252. An opening 2008 (FIG. 21) is defined between each of the side walls 2004 and the interior wall 252, and is sized to receive the leg 230 of the staple 214. The insulator legs 238 surround a portion of the staple legs 230, respectively, without surrounding the crown portion 226 of the staple 214. In other words, in the side view of the staple collation 210 in FIG. 19, the side wall 2004 of the insulator leg 238 covers a portion of the staple leg 230 while the crown 226 is uncovered or is fully visible.

Figure 19:
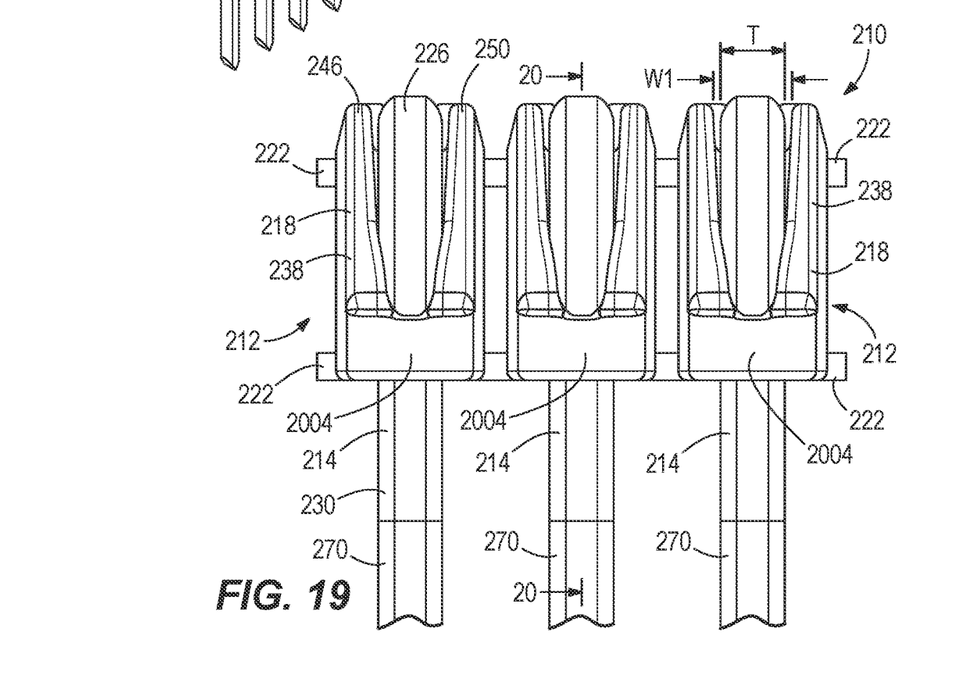
FIG. 19 is a side view of the staple collation of FIG. 18.
Figure 20:
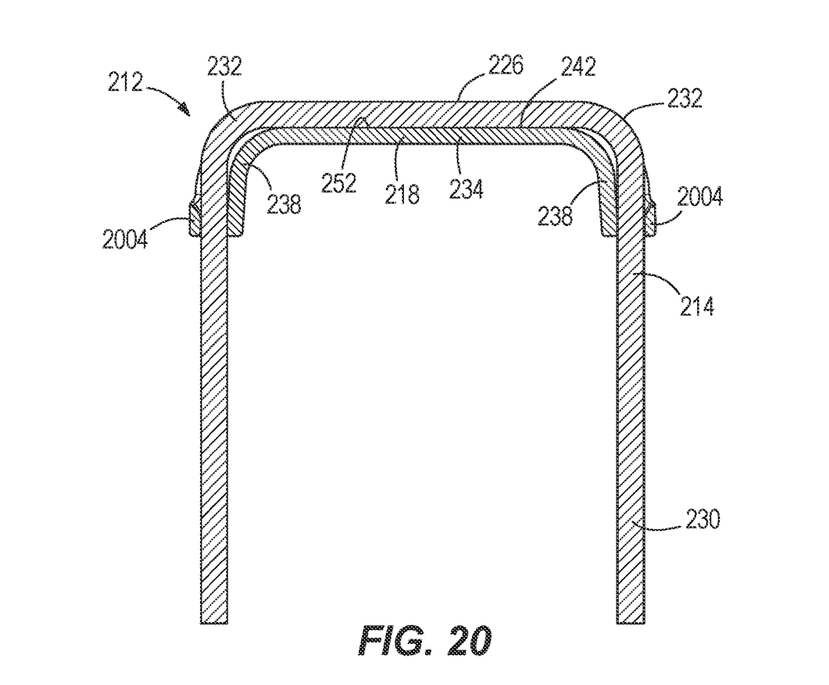
FIG. 20 is a cross-sectional view of the staple collation of FIG. 2 along line 20-20.

With reference to FIG. 19, along the bridge 234, a width W1 of the channel 242 is greater than the thickness T of the staple 214. At the insulator legs 238, the first and second insulator walls 246, 250 increase in thickness, thereby narrowing the width of the channel 242 through the legs 238. Each of the first and second insulator walls 246, 250 terminates at the side walls 2004, which connect opposite ends of the first and second insulator walls 246, 250. In the illustrated embodiment of the insulator 218, the width of the channel 242 through the insulator legs 238 decreases from the first width W1 to a second width W2 (FIG. 22), which is nominally less than the thickness T of the staple 214 (FIG. 19). The combination of the decreasing thickness of the insulator legs 238 and the side walls 2004 provide a slight friction-fit between the insulator 218 and the staple legs 230.

Figure 21:
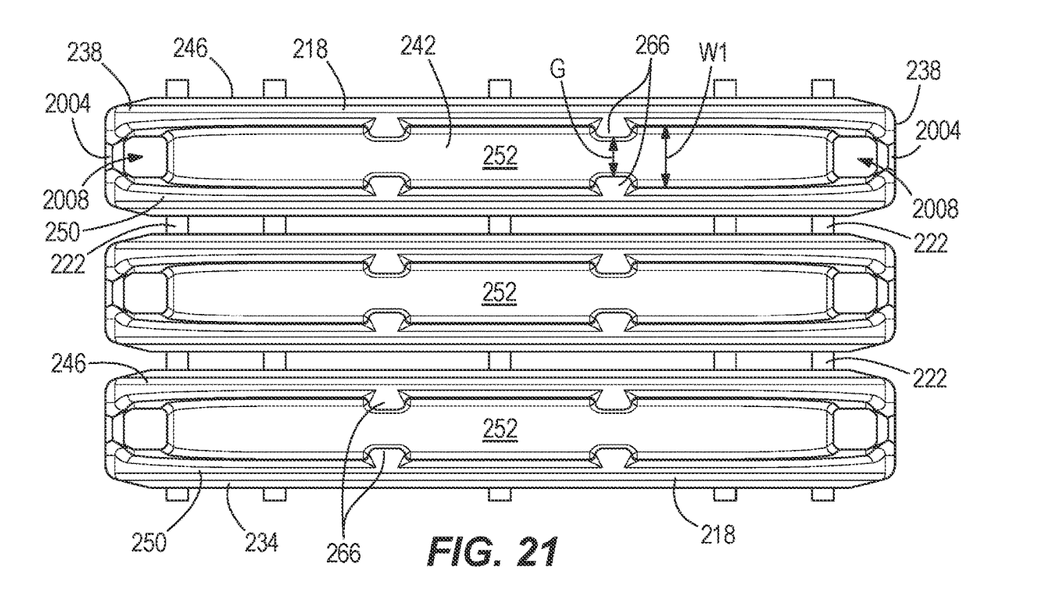
FIG. 21 is a top view of connected insulators of the staple collation of FIG. 18.
Figure 22:
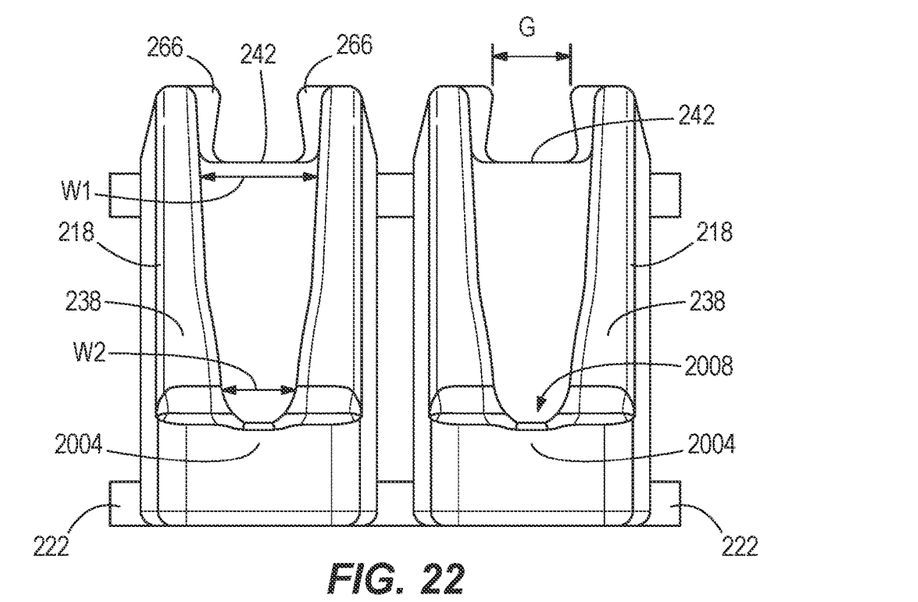
FIG. 22 is a side view of the connected insulators of FIG. 21.
Figure 23:
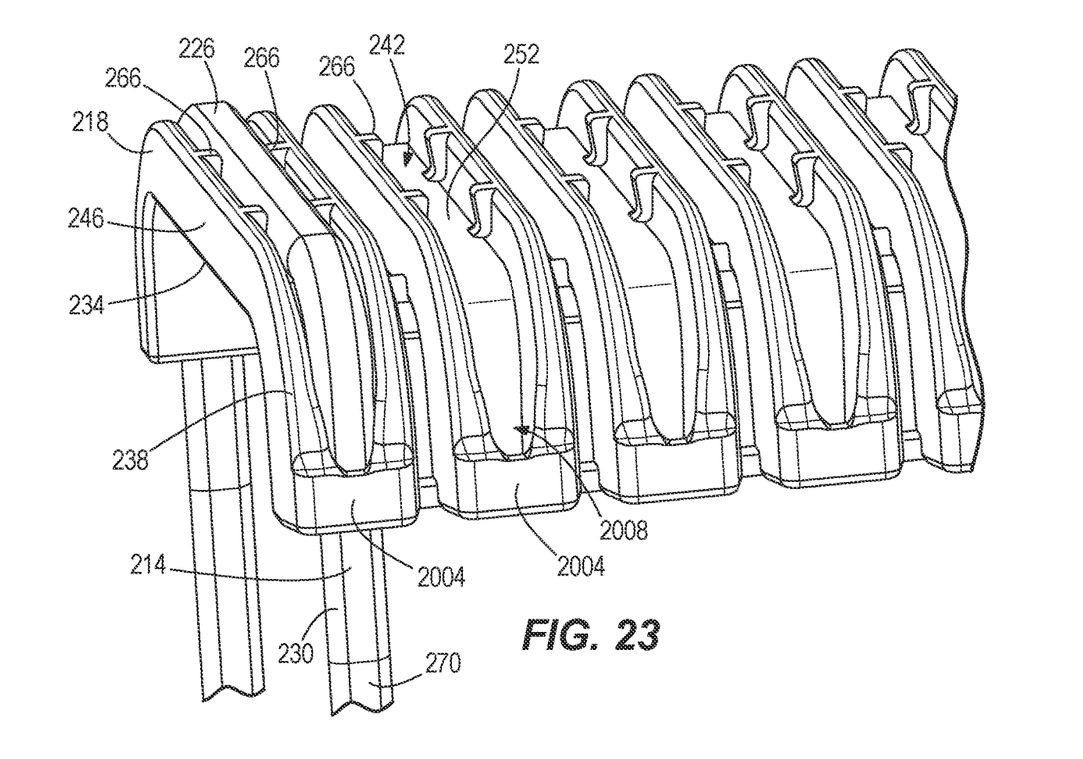
FIG. 23 is a perspective view of the connected insulators of FIG. 21.

With reference to FIGS. 21-23, along the insulator bridge 234, the first and second insulator walls 246, 250 include protrusions 266 that extend inwardly into the channel 242. Although the width W1 of the channel 242 at the insulator bridge 234 is less than the thickness T (FIG. 19) of the staple 214, a gap G (FIG. 22) between facing protrusions 266 on the walls 246, 250 is nominally less than the thickness T of the staple 214 to provide a slight friction-fit between the insulator 218 and the staple crown 226. When the staple 214 is received into the channel 242 of the insulator 218, a bottom face of the staple 214 engages with the interior wall 252 of the channel 242. The protrusions 266 at the insulator bridge 234 engage with opposite sides of the crown 226, clamping the crown 226 therebetween and inhibiting removal of the staple 214 from the insulator 218.

Frangible connectors 222 (FIGS. 19, 21, 22, and 23) extend from opposite sides of each insulator 218. A plurality of the frangible connectors 222 connect adjacent insulators 218. In the depicted embodiment, five frangible connectors 222 (FIG. 21) connect adjacent insulators 218—two frangible connectors 222 connect the insulator legs 238 and three frangible connectors 222 connect the insulator bridges 234. In alternative embodiments, more or fewer than five frangible connectors 222 may connect adjacent insulators 218. The frangible connectors 222 are configured to break in response to application of a shear force between two insulators 218. For example, the frangible connectors 222 connecting a first insulated staple 212 within the drive channel of a powered stapler with a second insulated staple 212 within the magazine of the powered stapler are broken in response to the drive blade of the powered stapler striking the crown 226 of the first insulated staple 212. When the frangible connectors 222 break, the first insulated staple 212 may be driven into a workpiece while the remainder of the staple collation 210 stays within the magazine of the powered stapler.

Although the invention has been described in detail with reference to certain preferred embodiments, variations and modifications exist within the scope and spirit of one or more independent aspects of the invention as described.

What is claimed is:

1. An insulated staple comprising:
    a staple including a crown extending between a pair of legs; and
    an insulator including an insulator bridge extending between a pair of insulator legs and a channel extending from an end of one of the insulator legs to an end of the other of the insulator legs;
    wherein the staple is at least partially received in the channel,
    wherein a width of the channel at the insulator bridge is greater than a thickness of the staple crown,
    wherein the insulator includes a plurality of protrusions extending into the channel and defining therebetween a gap that, in absence of the staple, has a width less than the width of the staple crown to provide a friction fit between the staple crown and the insulator, and
    wherein the protrusions include a tapered profile that engages with the crown of the staple.

2. The insulated staple of claim 1, wherein, in absence of the staple, a width of the channel at the insulator legs is less than a thickness of the staple legs to provide a friction fit between the staple legs and the insulator.

3. The insulated staple of claim 1, wherein the channel is defined by a first insulator wall, an opposite second insulator wall, and an interior wall.

4. The insulated staple of claim 3, wherein the plurality of protrusions includes a first protrusion extending from the first insulator wall and a second protrusion extending from the second insulator wall towards the first protrusion, and wherein the gap is defined between the first and second protrusions.

5. The insulated staple of claim 4, wherein the plurality of protrusions further includes third and fourth protrusions that extend, respectively, from the first and second insulator walls, and wherein the third and fourth protrusions are laterally spaced from the first and second protrusions, respectively.

6. The insulated staple of claim 3, wherein the first and second insulator walls increase in thickness at the insulator legs to narrow the width of the channel between the first and second insulator walls.

7. The insulated staple of claim 3, wherein the first and second insulator walls are not connected on the insulator legs, such that the insulator legs only partially surround the legs of the staple.

8. The insulated staple of claim 3, wherein each of the insulator legs includes a side wall that transversely extends between the first insulator wall and the second insulator wall.

9. The insulated staple of claim 8, wherein an opening is defined between the side wall and the interior wall, and wherein the opening is sized to receive the leg of the staple.

10. The insulated staple of claim 8, wherein the insulator legs surround a portion of the leg of the staple without surrounding the crown of the staple.

11. The insulated staple of claim 3, wherein one or more of the plurality of protrusions includes a first thickness defined adjacent the interior wall and a second thickness defined adjacent an opening of the channel, and wherein the first thickness is less than the second thickness.

12. A staple collation comprising:
    a plurality of insulated staples, each including
        a staple including a crown extending between a pair of legs; and
        an insulator including an insulator bridge extending between a pair of insulator legs and a channel extending from an end of one of the insulator legs to an end of the other of the insulator legs;
        wherein the staple is at least partially received in the channel,
        wherein a width of the channel at the insulator bridge is greater than a thickness of the staple crown,
        wherein the insulator includes a plurality of protrusions extending into the channel and defining therebetween a gap that, in absence of the staple, has a width less than the width of the staple crown to provide a friction fit between the staple crown and the insulator, and
        wherein the protrusions include a tapered profile that engages with the crown of the staple; and
    a plurality of frangible connectors extending from the insulator and coupling adjacent insulated staples.

13. The staple collation of claim 12, wherein, in absence of the staple, a width of the channel at the insulator legs is less than a thickness of the staple legs to provide a friction fit between the staple legs and the insulator.

14. The staple collation of claim 12, wherein the channel is defined by a first insulator wall, an opposite second insulator wall, and an interior wall.

15. The staple collation of claim 14, wherein the plurality of protrusions includes a first protrusion extending from the first insulator wall and a second protrusion extending from the second insulator wall towards the first protrusion, and wherein the gap is defined between the first and second protrusions.

16. The staple collation of claim 15, wherein the plurality of protrusions further includes third and fourth protrusions that extend, respectively, from the first and second insulator walls, and wherein the third and fourth protrusions are laterally spaced from the first and second protrusions, respectively.

17. The staple collation of claim 14, wherein the first and second insulator walls increase in thickness at the insulator legs to narrow the width of the channel between the first and second insulator walls.

18. The staple collation of claim 14, wherein each of the insulator legs includes a side wall that transversely extends between the first insulator wall and the second insulator wall.

19. The staple collation of claim 18, wherein an opening is defined between the side wall and the interior wall, and wherein the opening is sized to receive the leg of the staple.

20. The staple collation of claim 18, wherein the insulator legs surround a portion of the leg of the staple without surrounding the crown of the staple.

* * * * *